United States Patent Office 3,406,212
Patented Oct. 15, 1968

3,406,212
PROCESS FOR PREPARING 1,3-DICHLOROBUTANE
Karl O. Christie and Attila E. Pavlath, Berkeley, Calif., assignors to Stauffer Chemical Company, New York, N.Y., a corporation of Delaware
No Drawing. Filed Dec. 27, 1965, Ser. No. 516,714
5 Claims. (Cl. 260—652)

ABSTRACT OF THE DISCLOSURE

A process for the preparation of 1,3-dichlorobutane by reacting under substantially anhydrous conditions tetrahydrofuran with carbonyl chloride in the presence of hydrogen chloride preferably about 0.1 to 20% by weight based upon the weight of tetrahydrofuran used at atmospheric or superatmospheric pressure at a temperature preferably 50° to 120° C.

This invention relates to a new and novel process for the preparation of 1,3-dichlorobutane. More particularly, this invention pertains to a new and novel reaction whereby 1,3-dichlorobutane can be conveniently prepared in preference to 1,4-dichlorobutane.

Methods known in the available literature to prepare 1,3-dichlorobutane, such as by heating butanediol-1,3 in a sealed tube with hydrogen chloride or by the action of chlorine gas on 1-chlorobutane or 2-chlorobutane in the presence of actinic radiation, lead to erratic and inefficient production of 1,3-dichlorobutane. Ring-opening reactions of the tetrahydrofuran ring as reported in the prior art, with hydrogen chloride, thionyl chloride, or phosphorus oxychloride, in the presence of catalysts such as zinc chloride, aluminum chloride or aluminum oxide, yields exclusively 1,4-dichlorobutane. In German Patent 1,188,570 it is reported that tetrahydrofuran may be opened in the presence of carbonyl chloride and N,N-disubstituted formamides, especially N,N - dimethylformamide; however, this method produces exclusively 1,4-dichlorobutane.

It has now been found that surprisingly 1,3-dichlorobutane may be prepared in substantial yields by reaction of tetrahydrofuran with carbonyl chloride in the presence of hydrogen chloride. Therefore it is the principal object of our invention to provide for the preparation of 1,3-dichlorobutane starting with the cyclic aliphatic ether, tetrahydrofuran, by the new reaction involving carbonyl chloride and hydrogen chloride. Another object is provision of a process for preparing 1,3-dichlorobutane which avoids the formation of large quantities of 1,4-dichlorobutane.

Pursuant to the above-mentioned and yet further objects, it has been found that the cyclic aliphatic ether, tetrahydrofuran, may be opened conveniently by carbonyl chloride in the presence of hydrogen chloride to yield major portions of 1,3-dichlorobutane.

In one embodiment of the invention the hydrogen chloride source may be the compound hydrogen chloride. In a second embodiment of the invention the hydrogen chloride may be formed in situ from the interaction of an alcohol and carbonyl chloride. Examples of suitable in situ hydrogen chloride sources are ethylene glycol and carbonyl chloride, methyl alcohol and carbonyl chloride, and the like.

The reaction of the present invention is carried out under substantially anhydrous conditions in order to minimize hydrolysis of any susceptible intermediates that may be present. The vessel used for the process should be of a substantial material that will allow operation of high pressure and moderate temperatures. At the same time the vessel should also withstand the corrosive effects of the hydracid employed in the process under the given conditions. Provision should be made to remove excess carbonyl chloride after the reaction is completed. Some form of agitation of the reactants is desirable in order to achieve a more intimate contact thereof. When the reaction is vigorous it is desirable to employ a diluent such as benzene, toluene, or the like in order to moderate the reaction. The products of the reaction 1,3-dichlorobutane (B.P. 134° C.) and 1,4-dichlorobutane (B.P. 155° C.) may be conveniently separated by distillation.

The reaction of the process will proceed at atmospheric and superatmospheric pressure. However, the preferred pressures are superatmospheric. An excess of carbonyl chloride is employed to assist in shifting the equilibrium in the reactor to the desired products by mass action. The superatmospheric pressures develop autogenously in the reactor.

The ratio in which the reactants are used is not critical but for maximum yield of the 1,3-dichlorobutane the carbonyl chloride is preferably used in excess. The preferred range of reactants is at least 1 mole of carbonyl chloride for each mole of tetrahydrofuran to be reacted. The particularly preferred range is 1 to 2 moles of carbonyl chloride for each mole of tetrahydrofuran. An excess of carbonyl chloride is desirable to facilitate shifting the equilibrium to 1,3-dichlorobutane. The quantity of hydrogen chloride used in the reaction of the process is not narrowly critical. The hydracid acts as a catalyst, therefore the quantity required is rather small. Within the process there is regenerated sufficient hydrogen chloride to complete the reaction. The amount of hydrogen chloride either elementary or formed in situ, as mentioned supra, can range from as low as about 0.1 percent to as high as 20 percent based on the amount of tetrahydrofuran used.

A tertiary amine may be used as a secondary catalyst to facilitate the reaction of the instant process to prepare 1,3-dichlorobutane. The employment of a tertiary amine is not necessary. The determination of the formation of the 1,3-dichlorobutane in preference to the 1,4-dichlorobutane is not caused by the presence of a tertiary amine. The use of a secondary catalyst has been observed to facilitate an increase in the yield of 1,3-dichlorobutane. The reasons for this observation can not be explained fully. Several theoretical explanations may be offered but the applicants do not wish to be limited by any specific reaction mechanism.

The temperature of the reaction of the process is not narrowly critical and the process may be operated over a wide temperature range. The time required for the reaction is proportional to the temperature at which the process is conducted. In general, the operable temperature range will be greater than room temperature. Preferably the process will be carried out at between about 50° C. and about 120° C. At the higher temperatures shorter reaction times may be used, while conversely at the lower temperatures extended reaction times may be necessary in order to obtain acceptable conversions of starting materials. In general, for a batch process as described herein, the reaction time is between about 0.5 hour and about 48 hours. The specific temperatures and times to be employed are dependent upon the particular catalysts employed and may be readily determined by one skilled in the chemical arts.

Broadly considered, practice of the present invention involves contacting tetrahydrofuran with carbonyl chloride in the presence of hydrogen chloride or a hydrogen chloride source at autogenous pressures. Wherein the instant application relates to the preparation of 1,3-dichlorobutane, the process herein described may be applied also to the preparation of other 1,3-dihalobutanes, for example, 1,3-dibromobutane. The preparation of 1,3-dibromobutane may be brought about in an analogous manner by the opening of the tetrahydrofuran ring employing carbonyl bromide and hydrogen bromide.

The process of the present invention may be suitably carried out by introducing under substantially anhydrous conditions gaseous carbonyl chloride and hydrogen chloride into a cooled pressure vessel containing tetrahydrofuran. If a hydrogen chloride donor source is employed the hydroxy compound is placed in the pressure vessel with the tetrahydrofuran prior to the introduction of the preferably heated while being agitated by some suitable means for a time sufficient to convert the tetrahydrofuran to 1,3-dichlorobutane. After cooling to room temperature the gaseous material is removed from the pressure vessel. Recovery and separation of the 1,3-dichlorobutane produced therein is carried out by normal distillation techniques.

The following examples further illustrate the process of this invention.

Example 1

The following reactions were carried out in a 75 ml. stainless steel lecture bottle equipped with suitable gas inlet and pressure registering devices. Into the vessel was added 0.1 mole of tetrahydrofuran. The vessel was cooled to 0° C. and 0.12 mole of carbonyl chloride was introduced. Also added to the cooled cylinder was sufficient hydrogen chloride equal to about 4 percent, based on the amount of tetrahydrofuran used. The lecture bottle was closed and the pressure registering equipment attached. The reactants in the pressure vessel were shaken while being heated to 100° C. This condition was maintained for twelve hours. At the end of this time the reactor was allowed to cool to room temperature and the excess carbonyl chloride was removed. The liquid reaction products were analyzed by gas chromatography. The reaction products were further separated by distillation. There was obtained a 100 percent conversion of the tetrahydrofuran with the products being 65.6 percent 1,3-dichlorobutane (B.P. 134° C.) and 34.3 percent 1,4-dichlorobutane (B.P. 155° C.).

Example 2

Using a reactor and process as described in Example 1, a mixture of 0.09 mole of tetrahydrofuran and 4 percent methanol (based on the amount of tetrahydrofuran used) and 0.09 mole of carbonyl chloride were heated together at 100° C. for 12 hours. There was obtained a 100 percent conversion of tetrahydrofuran with yields of 59.5 percent 1,3-dichlorobutane and 40.5 percent 1,4-dichlorobutane. This example with Example 3 illustrates the use of in situ hydrogen chloride sources.

Example 3

Using a reactor and process as described in Example 1, a mixture of 0.09 mole of tetrahydrofuran and 4 percent ethylene glycol (based on the amount of tetrahydrofuran used) and 0.09 mole of carbonyl chloride were heated together at 60° C. for 14 hours. There was obtained a 99 percent conversion of tetrahydrofuran with yields of 47.5 percent 1,3-dichlorobutane and 52.5 percent 1,4-dichlorobutane.

The following observations also were made during the experimentation for the instant process. When the reaction between carbonyl chloride and tetrahydrofuran was attempted without the presence of hydrogen chloride or a hydrogen chloride source no dichlorobutanes were obtained. When tetrahydrofuran and a large molar excess of hydrogen chloride were reacted at 100° C. for 1 to 2 hours without the presence of carbonyl chloride, only 1,4-dichlorobutane was formed. Therefore, in carrying out the process of the present invention for the preparation of 1,3-dichlorobutane it is necessary that tetrahydrofuran be reacted with carbonyl chloride in the presence of hydrogen chloride or a hydrogen chloride source.

Various changes and modifications may be made in the process described herein as will be apparent to those skilled in the chemical arts. It is accordingly intended that the present invention only be limited by the scope of the appended claims.

We claim:

1. A process for the preparation of 1,3-dichlorobutane comprising reacting under substantially anhydrous conditions tetrahydrofuran with carbonyl chloride in the presence of hydrogen chloride at a temperature greater than room temperature and at a pressure of at least atmospheric.

2. The process as described in claim 1 wherein said hydrogen chloride is formed in situ from an alcohol and carbonyl chloride.

3. The process as described in claim 2 wherein said alcohol is methanol.

4. The process as described in claim 2 wherein said alcohol is ethylene glycol.

5. A process for the preparation of 1,3-dichlorobutane comprising reacting tetrahydrofuran with carbonyl chloride under substantially anhydrous conditions at superatmospheric pressure at a temperature between about 50° C. and about 120° C. in the presence of about 0.1 to 20% by weight hydrogen chloride based upon the weight of tetrahydrofuran used.

References Cited

UNITED STATES PATENTS

| | | | |
|---|---|---|---|
| 2,218,018 | 10/1940 | Cass | 260—652 XR |
| 2,491,834 | 12/1949 | Scott | 260—657 |
| 2,889,380 | 6/1959 | Hamel | 260—657 |
| 3,206,516 | 9/1965 | Ziegenbein et al. | 260—652 |

BERNARD HELFIN, *Primary Examiner.*

H. MARS, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,406,222                                October 15, 1968

Henry Moncure, Jr.

It is certified that error appears in the above identified patent and that said Letters Patent are hereby corrected as shown below:

Column 1, line 30, before "by" insert -- modified --. Column 2, line 48, "notrogen" should read -- nitrogen --; line 49, "ploymer" should read -- polymer --; line 62, "valve" should read -- value --. Column 3, line 5, "YI=R-B/G×100" should read -- $YI = \frac{R-B}{G} \times 100$ --.

Signed and sealed this 3rd day of March 1970.

(SEAL)
Attest:

Edward M. Fletcher, Jr.                          WILLIAM E. SCHUYLER, JR.
Attesting Officer                                    Commissioner of Patents